(12) United States Patent
Hsiao et al.

(10) Patent No.: US 7,629,758 B2
(45) Date of Patent: Dec. 8, 2009

(54) DRIVING APPARATUS AND A DRIVING METHOD FOR A SINGLE PHASE MOTOR

(75) Inventors: Ying-Chen Hsiao, Hsinchu (TW); Yi-Chen Chen, Hsinchu (TW); Yi-Chen Lin, Hsinchu (TW); Juh-Gua Shiau, Hsinchu (TW)

(73) Assignee: Holtek Semiconductor Inc., Hsinchu (TW)

(*) Notice: Subject to any disclaimer, the term of this patent is extended or adjusted under 35 U.S.C. 154(b) by 296 days.

(21) Appl. No.: 11/715,482

(22) Filed: Mar. 8, 2007

(65) Prior Publication Data

US 2008/0074066 A1    Mar. 27, 2008

(30) Foreign Application Priority Data

Sep. 26, 2006    (TW) .............................. 95135632 A

(51) Int. Cl.
*H02P 1/00* (2006.01)
(52) U.S. Cl. ...................... 318/293; 318/268; 318/254.1
(58) Field of Classification Search .................. 318/268, 318/254.1, 293
See application file for complete search history.

(56) References Cited

U.S. PATENT DOCUMENTS

| | | | | | |
|---|---|---|---|---|---|
| 4,794,310 | A | * | 12/1988 | Lukas et al. | 388/823 |
| 6,066,930 | A | * | 5/2000 | Horiguchi et al. | 318/400.29 |
| 6,144,235 | A | * | 11/2000 | Marano et al. | 327/110 |
| 6,157,151 | A | * | 12/2000 | Yoshitomi et al. | 318/400.2 |
| 6,563,284 | B2 | * | 5/2003 | Teutsch et al. | 318/599 |
| 6,909,252 | B2 | * | 6/2005 | Xi | 318/400.29 |
| 7,002,307 | B2 | * | 2/2006 | Yoshitomi et al. | 318/400.29 |

* cited by examiner

*Primary Examiner*—Bentsu Ro
*Assistant Examiner*—David S Luo
(74) *Attorney, Agent, or Firm*—Rosenberg, Klein & Lee

(57) ABSTRACT

A driving apparatus and a driving method for a single phase motor utilizes a driving transistor unit, and an auxiliary driving transistor unit to provide two driving currents with the same direction as the single phase coil. Next, a control unit is used to control the conducting and shutting down of the driving transistor unit and the auxiliary driving transistor unit according to the location of the rotating device of the single phase motor. Thereby, the driving current on the single phase coil recirculates to reduce the vibration and noise of the single phase motor, and prevent the problem of the single phase motor not turning on.

9 Claims, 13 Drawing Sheets

DRIVING APPARATUS AND A DRIVING METHOD FOR A SINGLE PHASE MOTOR

BACKGROUND OF THE INVENTION

1. Field of the Invention

The present invention relates to a single phase motor. In particular, this invention relates to a driving apparatus and a driving method for a single phase motor.

2. Description of the Related Art

Reference is made to FIGS. 1A~1C, a driving apparatus for a single phase motor of the prior art is illustrated. FIGS. 1A and 1B are the block diagram of the driving apparatus for a single phase motor of the prior art. FIG. 1C is a timing chart of the signals in the driving apparatus for a single phase motor of the prior art. The driving apparatus of the prior art includes four driving transistors 102, 104, 108, 110, two recirculating diodes 112, 114, a single phase coil 106, a hall apparatus 116, a comparing circuit 118, an absolute value circuit 120, a detecting device 122, and a control circuit 132.

First, the hall apparatus 116 senses the rotating location of the single phase motor. This means that the hall apparatus 116 senses the variation of the magnetic poles located in the rotor to output a sine wave signal. Next, the comparing circuit 118 reshapes the sine wave signal outputted from the hall apparatus 116 into a square wave signal. The square wave signal is a current-switching signal. The absolute value circuit 120 compares the level of the sine wave signal with a reference value to output a timing signal to recirculate the driving current of the single phase coil 106. The comparing circuit 130 compares the charging/discharging voltage in a non-grounded terminal of the comparing capacitor 124 with the reference voltage VREF to determine whether the single phase motor is rotating or not. When the single phase motor is rotating, an "H" detecting signal is outputted. When the single phase motor is not rotating, an "L" detecting signal is outputted.

Finally, the control circuit 132 calculates the outputs of the comparing circuit 118 and the absolute value circuit 120 according to the output of the detecting device 122. When the detecting signal is "L", the driving signals A1, B1, C1, and D1 are outputted. When the detecting signal is "H", the driving signals A2, B2, C2, and D2 are outputted.

Because the sine wave signal outputted from the hall apparatus 116 has a 180 degrees phase difference between the black line and the dotted line, a zero cross point (a current-switching point of the driving current) exists.

When the driving signals A2 and D2 rise, the driving transistors 102 and 104 are conducted (ON-status). The direction of the driving current in the signal phase coil 106 is right while facing to paper. When the driving signal A2 descends, only the driving transistor 104 is conducted. The driving current counterclockwise circles along the recirculating path (represented by the dotted line) composed of the single phase coil 106, the driving transistor 104, and the recirculating diode 112, consumes and becomes zero. When the driving signal D2 also descends, the driving transistor 104 turns off on the zero cross point.

When the driving signals B2 and C2 rise, the driving transistors 108 and 110 are conducted (ON-status). The direction of the driving current in the signal phase coil 106 is left while facing to paper. When the driving signal C2 descends, only the driving transistor 110 is conducted. Therefore, the driving current counterclockwise circles along the recirculating path (represented by the dotted-dash line), consumes and becomes zero. When the driving signal B2 also descends, the driving transistor 110 turns off.

Reference is made to FIGS. 2A and 2B, which show a schematic diagram of part of a circuit of a driving apparatus for a single phase motor of the prior art, and a timing chart of the signals in the driving apparatus for a single phase motor of the prior art.

The transistors 2, and 4 provide the driving current to the single phase coil 6 in the right direction while facing to the paper via the driving signals A and D. The collector-base of the transistor 2, the single phase coil 6, and the collector-emitter of the transistor 4 are connected in series and are connected between the power Vcc and the grounding Vss. The transistors 8 and 10 provide the driving current to the single phase coil 6 in the left direction while facing to the paper via the driving signals C and B. The collector-emitter of the transistor 8, the single phase coil 6, and the collector-emitter of the transistor 10 are connected in series and are connected between the power Vcc and the grounding Vss. Therefore, the transistors 2, 4, and the transistors 8, 10 are individually on one of the ON and OFF statuses to change the direction of the driving current on the single phase coil 6 to make the single phase motor rotate.

However, the timing of the driving signals A, B, C, and D, merely shift a little, the driving current on the single phase coil 6 does not have a positive effect upon the slope redundant current. The direction of the driving current of the single phase coil 6 rapidly changes so that the single phase motor suffers some problems, including vibration, noise, and a heavy power consumption.

SUMMARY OF THE INVENTION

A driving apparatus and a driving method for a single phase motor utilizes a driving transistor unit, and an auxiliary driving transistor unit to provide two driving current with the same direction as the single phase coil. Next, a control unit is used to control the conducting and shutting down of the driving transistor unit and the auxiliary driving transistor unit according to the location of the rotating device of the single phase motor. Thereby, the driving current on the single phase coil recirculates to reduce the vibration and noise of the single phase motor, and prevents the problem of the single phase motor not turning on from occurring.

The driving apparatus includes a hall apparatus, an amplifying circuit, an absolute value circuit, a control unit, two driving transistor units, two auxiliary driving transistor units, two recirculating diode units, and a single phase coil.

First, the amplifying circuit and the absolute value circuit individually converts the sine wave signal detect by the hall apparatus into an amplified signal, and an absolute value signal. Next, the control unit processes and calculates the amplified signal and the absolute value signal to generate a plurality of first driving signals, and a plurality of second driving signals.

Finally, the first driving signals and the second driving signals are used to control two driving transistor units and two auxiliary driving transistor units to be conducted or be at off status. Thereby, a driving path is formed in the driving apparatus or a recirculating path is formed by cooperating with the recirculating diode to drive the single phase motor.

The auxiliary driving transistor units can replace the detecting device of the prior art, and prevents the condition of the single phase motor not turning on from occurring when the motor stops at the switch phase delay pulse location.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1A:
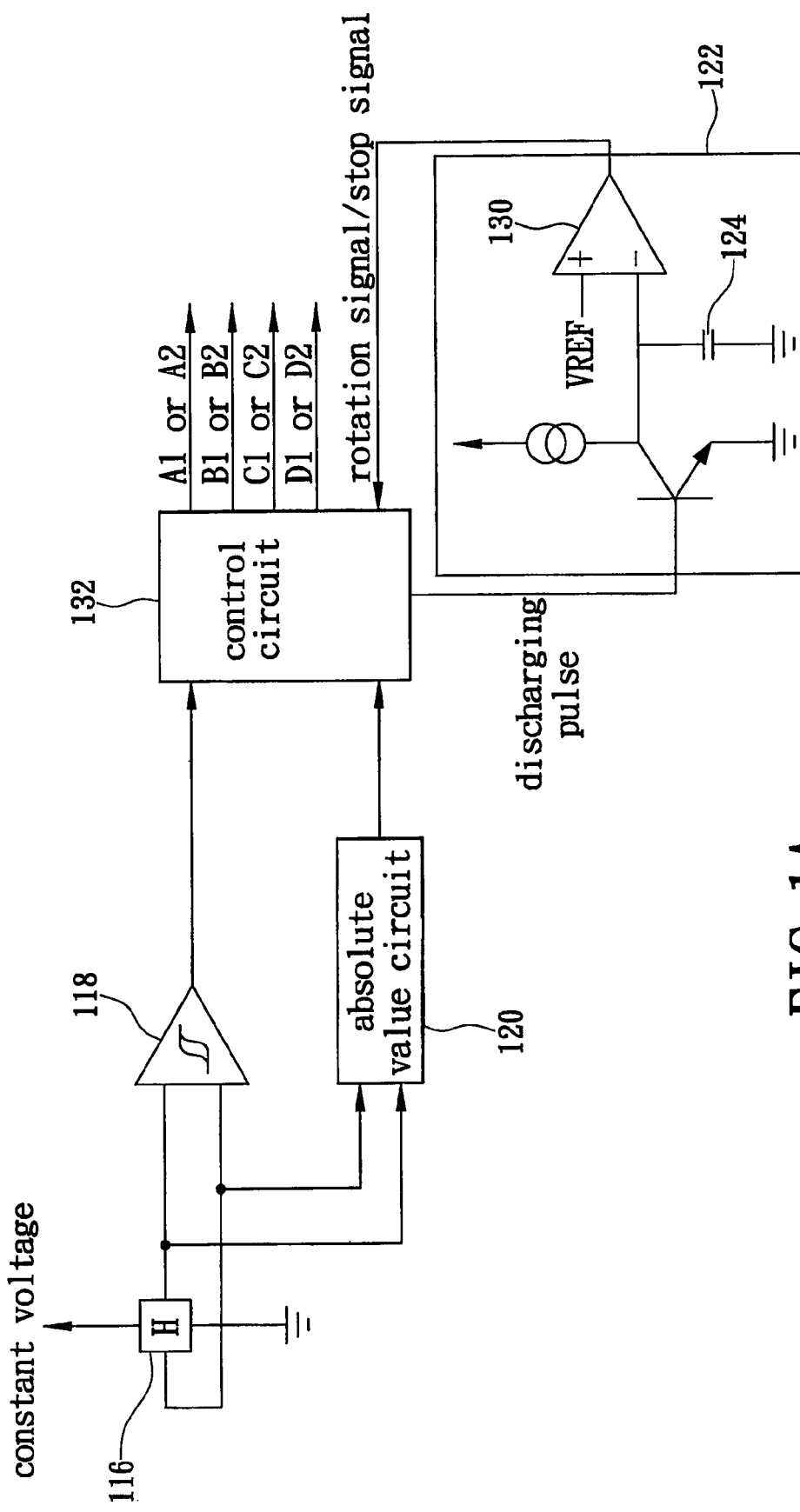
FIG. 1A is a block diagram of the driving apparatus for a single phase motor of the prior art.
Figure 1B:
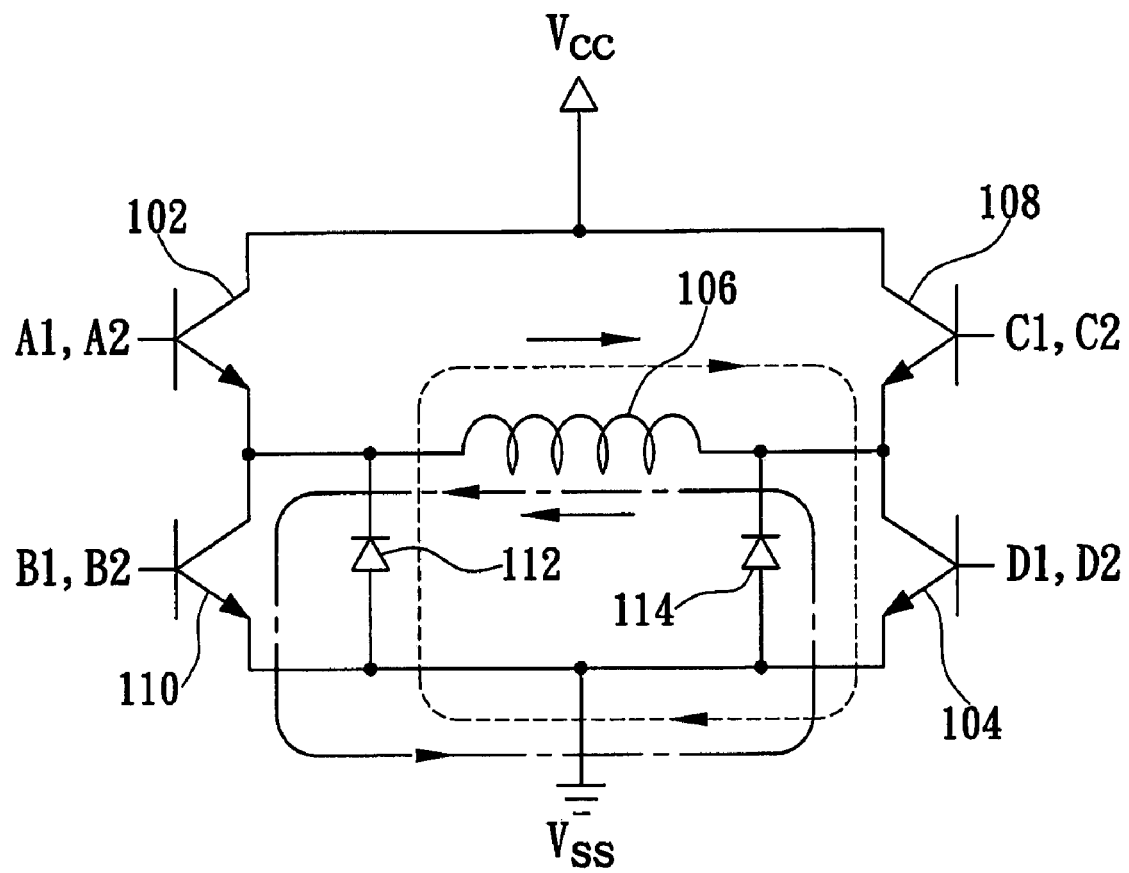
FIG. 1B is a block diagram of the driving apparatus for a single phase motor of the prior art.
Figure 1C:
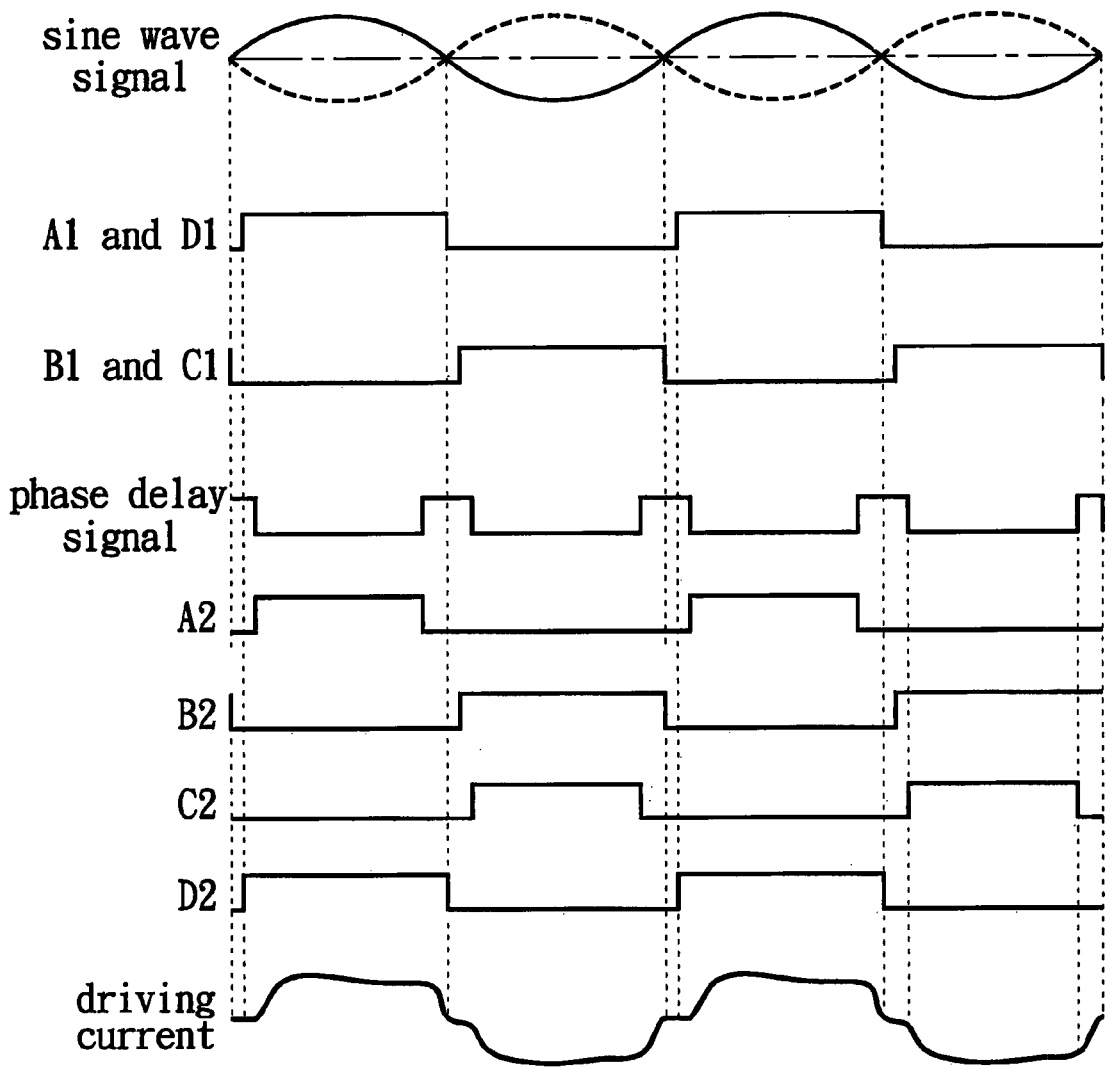
FIG. 1C is a timing chart of the signals in the driving apparatus for a single phase motor of the prior art.
Figure 2A:
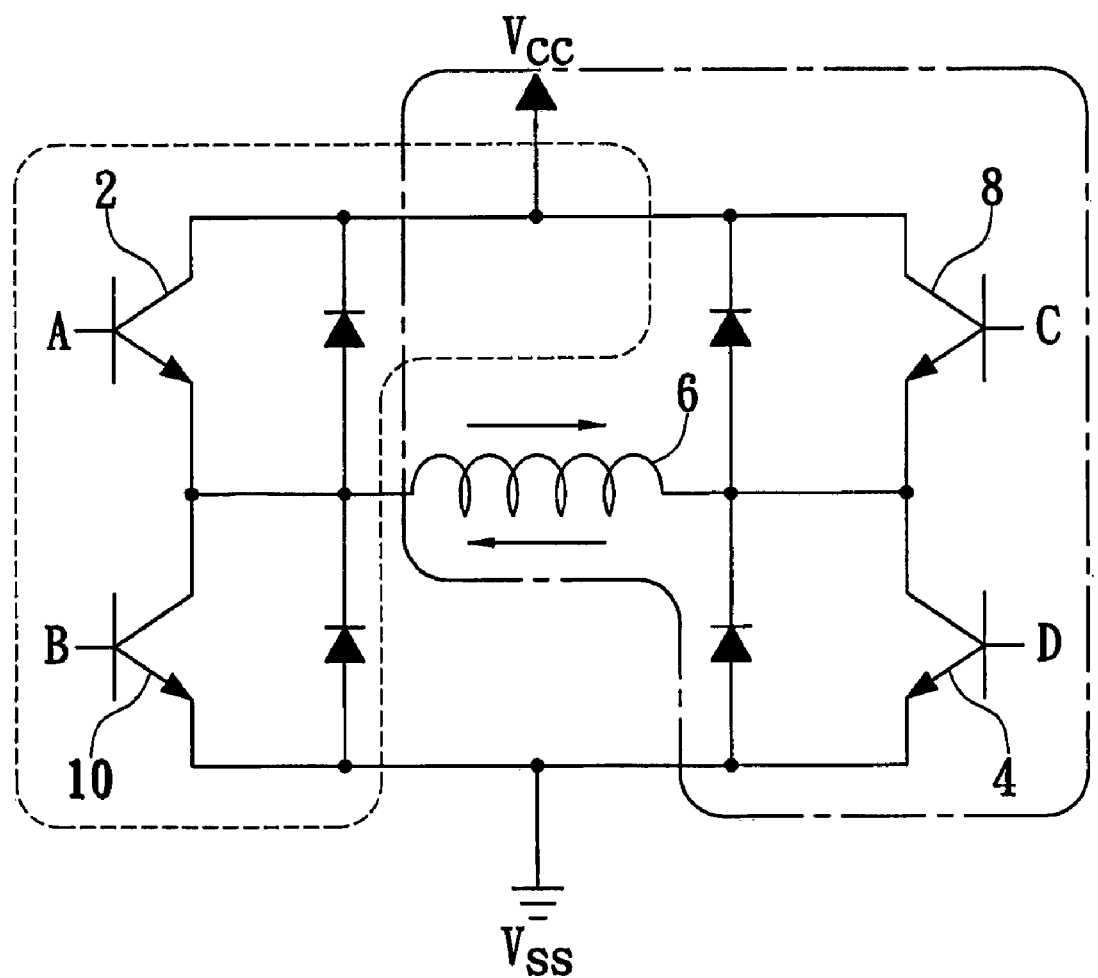
FIG. 2A is a schematic diagram of part of a circuit of another driving apparatus for a single phase motor of the prior art.
Figure 2B:
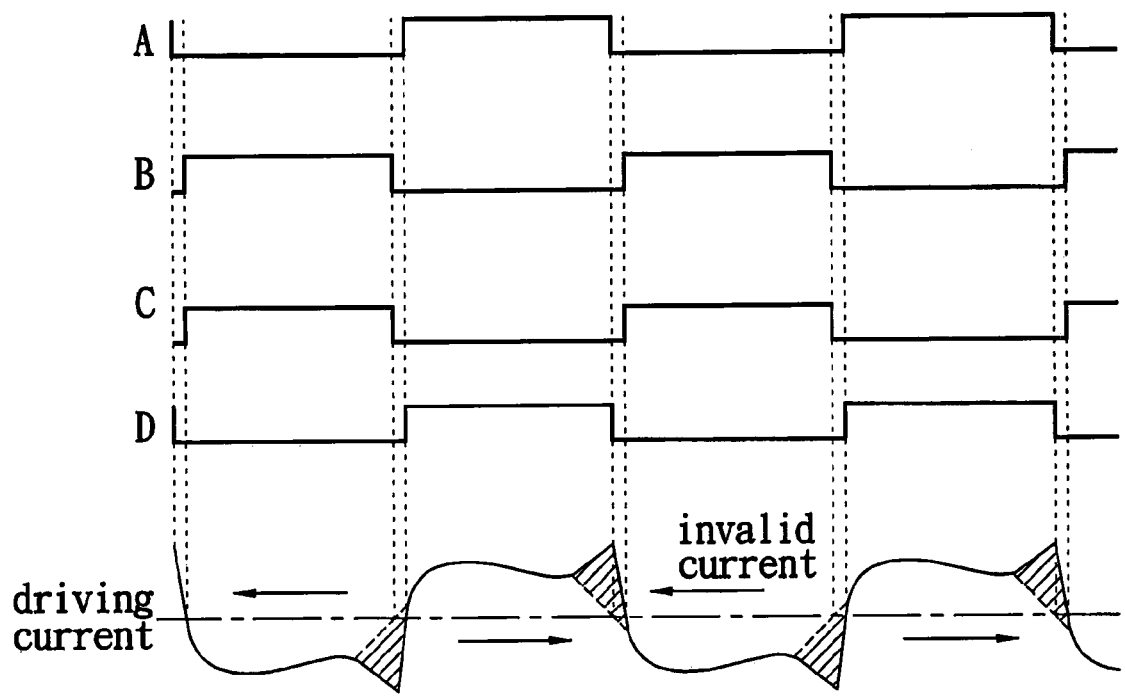
FIG. 2B is a timing chart of the signals in the driving apparatus for another single phase motor of the prior art.
Figure 3A:
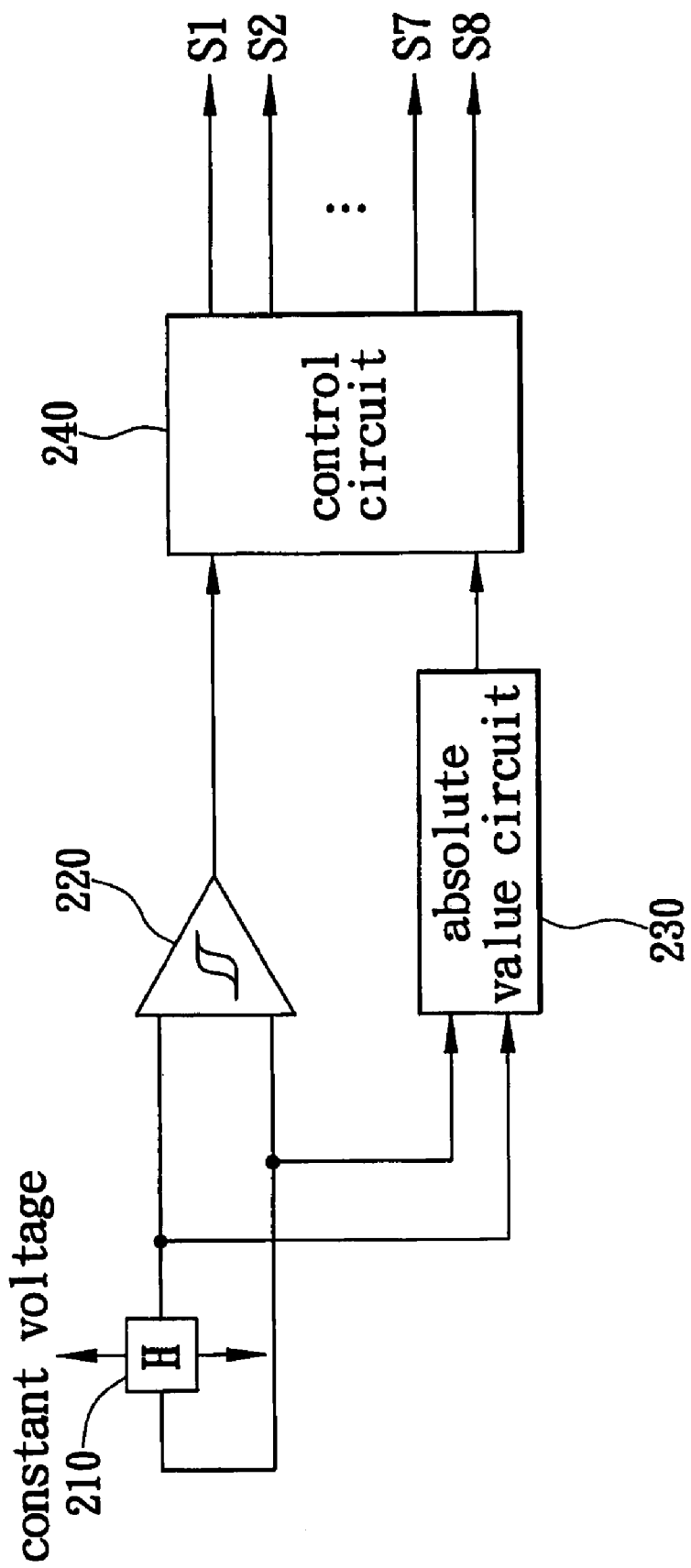
FIG. 3A is a block diagram of the driving apparatus for a single phase motor of the present invention.
Figure 3B:
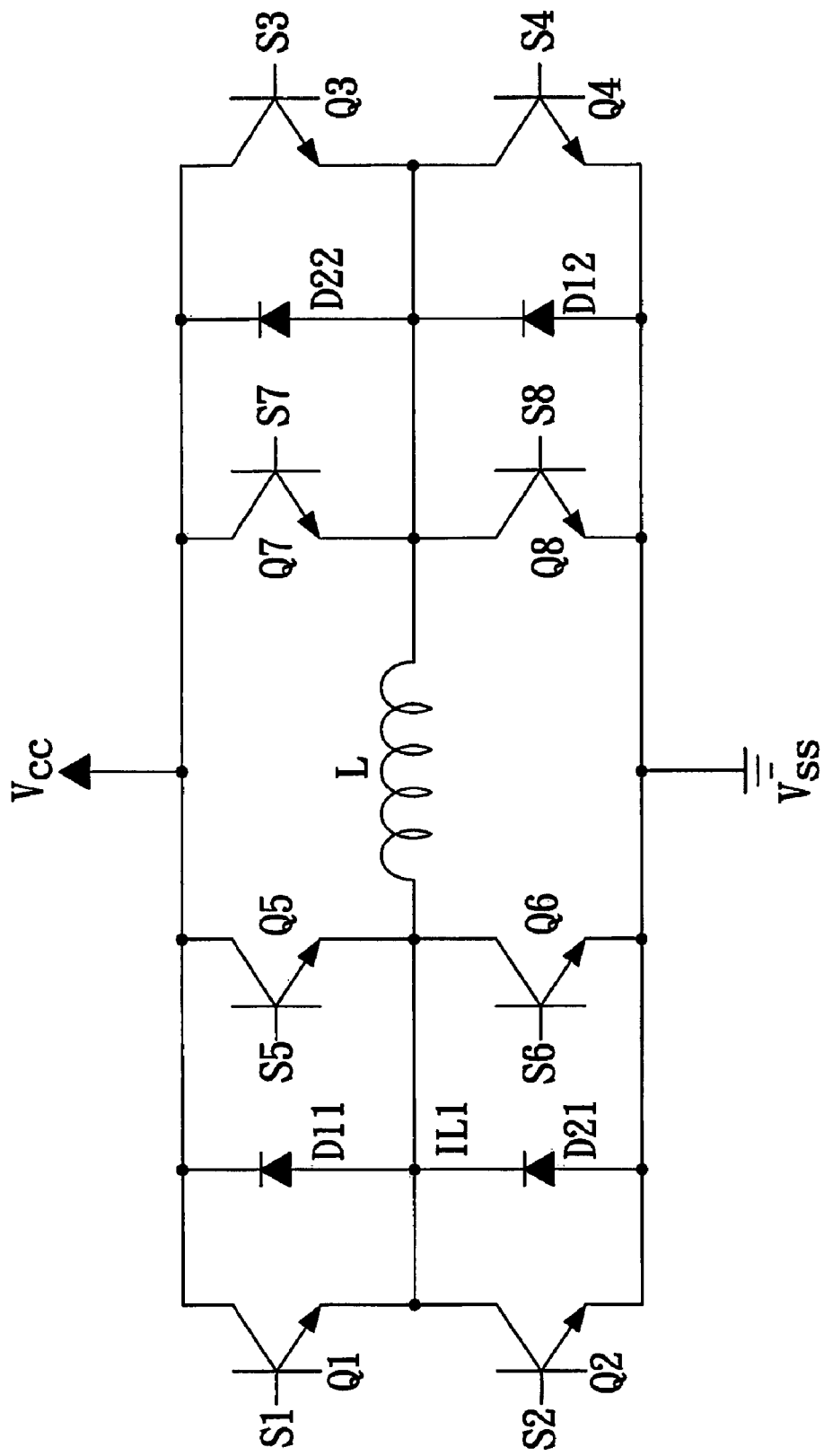
FIG. 3B is a block diagram of the driving apparatus for a single phase motor of the present invention.

Reference is made to FIGS. 3A and 3B, which show block diagrams of the driving apparatus for a single phase motor of the present invention. The driving apparatus of the single phase motor is manufactured into an integrated circuit (IC). The single phase coil L of the single phase motor is externally connected with the integrated circuit.

The driving apparatus includes a hall apparatus 210, an amplifying circuit 220, an absolute value circuit 230, a control unit 240, two driving transistor units, two auxiliary driving transistor units, two recirculating diode units, and a single phase coil L. One driving transistor unit is composed of driving transistors Q1, Q4. Another driving transistor unit is composed of driving transistors Q2, Q3. One auxiliary driving transistor unit is composed of driving transistors Q5, Q8. Another auxiliary driving transistor unit is composed of driving transistors Q6, Q7. One recirculating diode unit is composed of driving transistors D11, D12. Another recirculating diode unit is composed of driving transistors D21, D22. The driving current provided from each of the auxiliary driving transistors Q5, Q6, Q7, Q8 is less than the driving current provided by each of the driving transistors Q1, Q2, Q3, Q4. This means that the layout of each of the auxiliary driving transistors is smaller than the layout of each of the driving transistors.

The hall apparatus 210 is located at a specific location on the rotating device of the single phase motor that faces the magnet, and is biased by a constant voltage. Thereby, the hall apparatus 210 can detect the rotating location of the single phase motor, and outputs a sine wave signal according to the detected pole variation of the rotating device. The amplifying circuit 220 has hysteresis characteristic that prevents the motor from vibrating, and reshapes the sine wave signal outputted from the hall apparatus 210 into a square wave signal to generate an amplified signal with hysteresis characteristic. The absolute value circuit 230 compares the level of the sine wave signal with a reference value to output an absolute value signal to the control unit 240 to recirculate the driving current on the single phase coil L.

Figure 4:
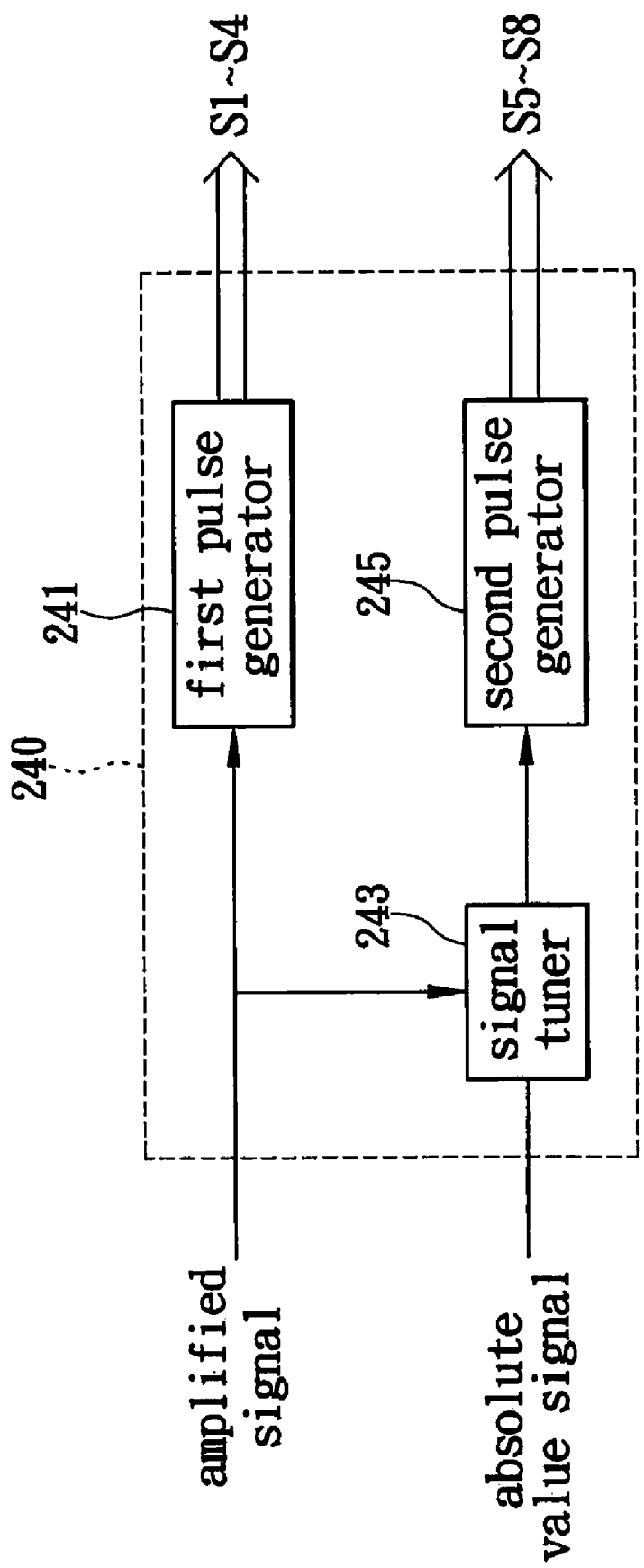
FIG. 4 is a block diagram of the control unit of the present invention.

The control unit 240 corresponds to the sine wave signal outputted from the hall apparatus 210 to process and calculate the absolute value signal provided from the absolute value circuit 230 and the amplified signal provided from the amplifying circuit 220, and to generate a set of first driving signals S1, S2, S3, S4, and a set of second driving signals S5, S6, S7, S8. The control unit 240 further includes a first pulse generator 241, and a signal tuner 243, and a second pulse generator 245, as shown in FIG. 4.

The first pulse generator 241 adjusts the amplified signal provided from the amplifying circuit 220 to generate the plurality of first driving signals S1, S2, S3, S4. The signal tuner 243 adjusts the amplified signal provided from the amplifying circuit 220 according to the absolute value signal provided from the absolute value circuit 230 to make the second pulse generator 245 generate the plurality of second driving signals S5, S6, S7, S8.

Figure 9:
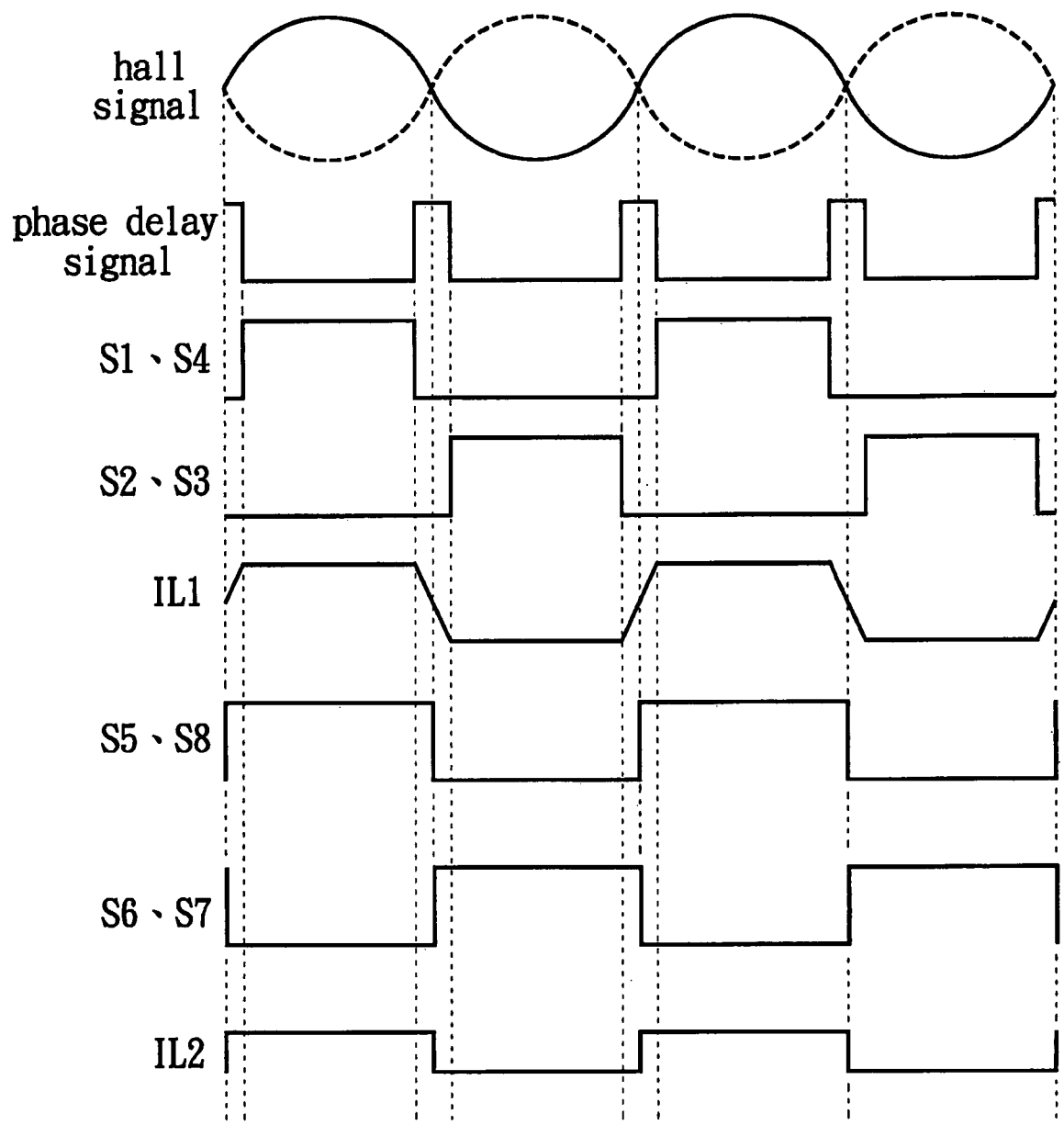
FIG. 9 is a timing chart of the signals in the driving apparatus for a single phase motor of the present invention.

In order to illustrate the operation of the control unit 240 of the present invention in detail, please refer to FIGS. 3A, 3B and 9. FIG. 9 shows a timing chart of the signals in the driving apparatus for a single phase motor of the present invention.

The hall apparatus 210 corresponds to the rotating location of the single phase motor and outputs a sine wave signal with a black line and dotted line. The differential phase between the block line sine wave signal and the dotted line sine wave signal is 180 degrees. Therefore, a zero cross point exists at the crossing location of the block line sine wave signal and the dotted line sine wave signal. Next, the amplifying circuit 220 adjusts the sine wave signal to generate an amplified signal to the control unit 240. The amplified signal is a current-switching signal that is a reference for switching the direction of the first driving current IL1 or the second driving current IL2 on the single phase coil L. The absolute value circuit 230 compares the level of the sine wave signal with the reference value to output an absolute value signal to the control unit 240 to recirculate the first driving current IL1 or the second driving current IL2 on the single phase coil L.

The control unit 240 processes and calculates the absolute value signal provided from the absolute value circuit 230 to output the second driving signals S5, S6, S7, S8. Similarly, the control unit 240 processes and calculates the amplified signal provided from the amplifying circuit 220 to directly output the first driving signals S1, S2, S3, S4.

When the sine wave signal is close to the zero cross point, the absolute value circuit 230 generates an absolute value signal. The absolute value signal is a phase delay signal and is composed of a plurality of pulses. At this time, the phase delay signal changes from 0 to 1, or from 1 to 0. When the sine wave signal reaches the zero cross point, the phase delay signal will maintain a high voltage status (represented by 1) or a low voltage status (represented by 0). The first driving signals S1, S2, S3, S4 outputted from the control unit 240 change their signal status—from 1 to 0, or from 0 to 1. When the sine wave signal reaches the zero cross point, the first driving signals S1, S2, S3, S4 change their signal status—from 1 to 0, or from 0 to 1.

The phase delay signal between the first driving signals S1, S4 and the first driving signals S2, S3 is one pulse. The turning on between the second riving signals S5, S8 and the second driving signals S6, S7 is repelled. The purpose of the auxiliary transistors Q5~Q8 driven by the second driving signals S5~S8 is that the auxiliary transistors provide part of a driving current to the coil when the motor is operating normally. Furthermore, when the motor is on the stopped status, the problem of the motor not restarting the motor coil due to the motor coil being located at the phase delay pulse is avoided. Therefore, the detecting device of the prior art is omitted.

Figure 5:
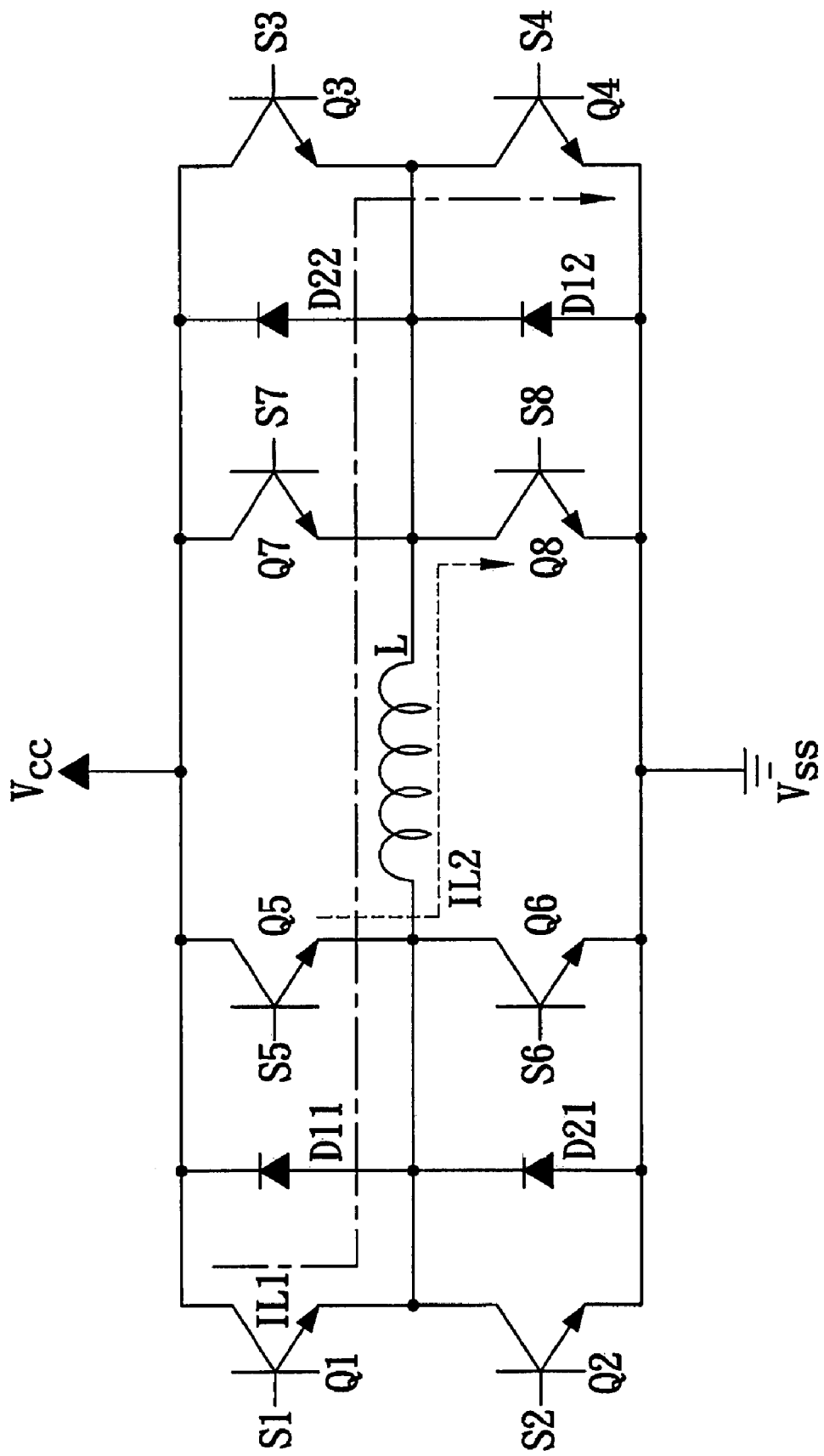
FIG. 5 is a schematic diagram of the driving path of the driving current of the present invention.
Figure 6:
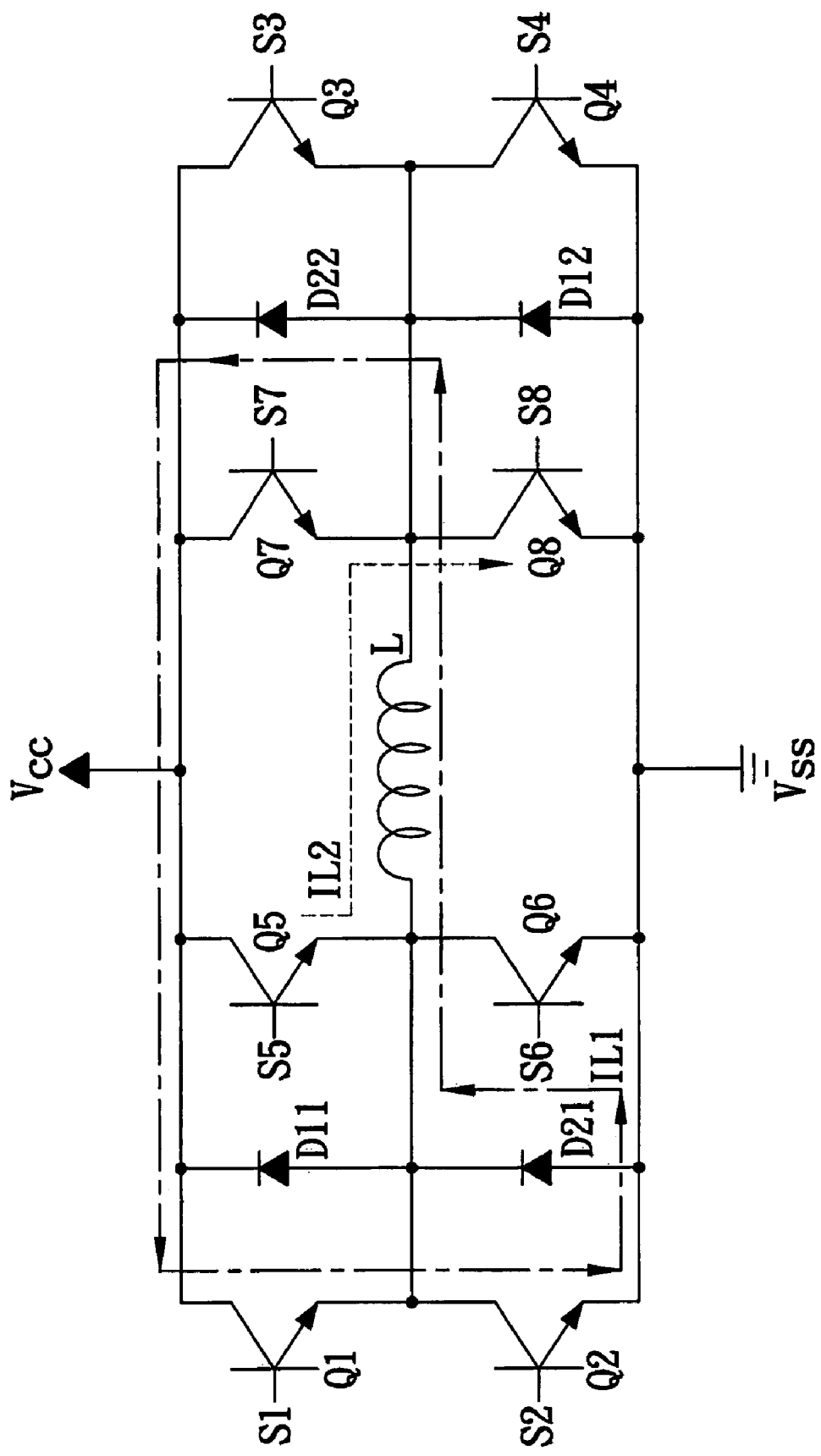
FIG. 6 is a schematic diagram of the recirculating path of the driving current of the present invention.
Figure 7:
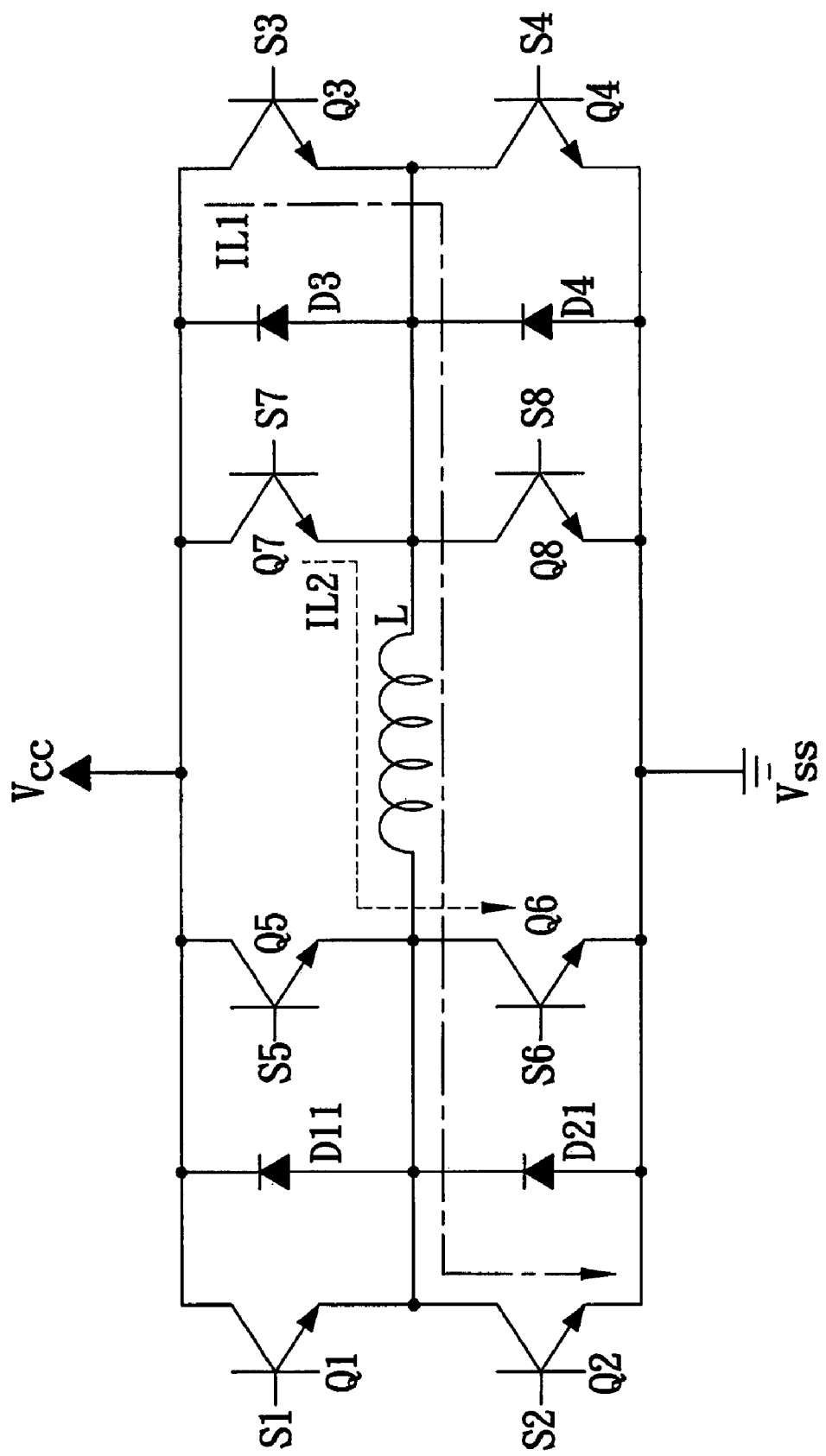
FIG. 7 is a schematic diagram of the driving path of the driving current of the present invention after the current phase has changed.
Figure 8:
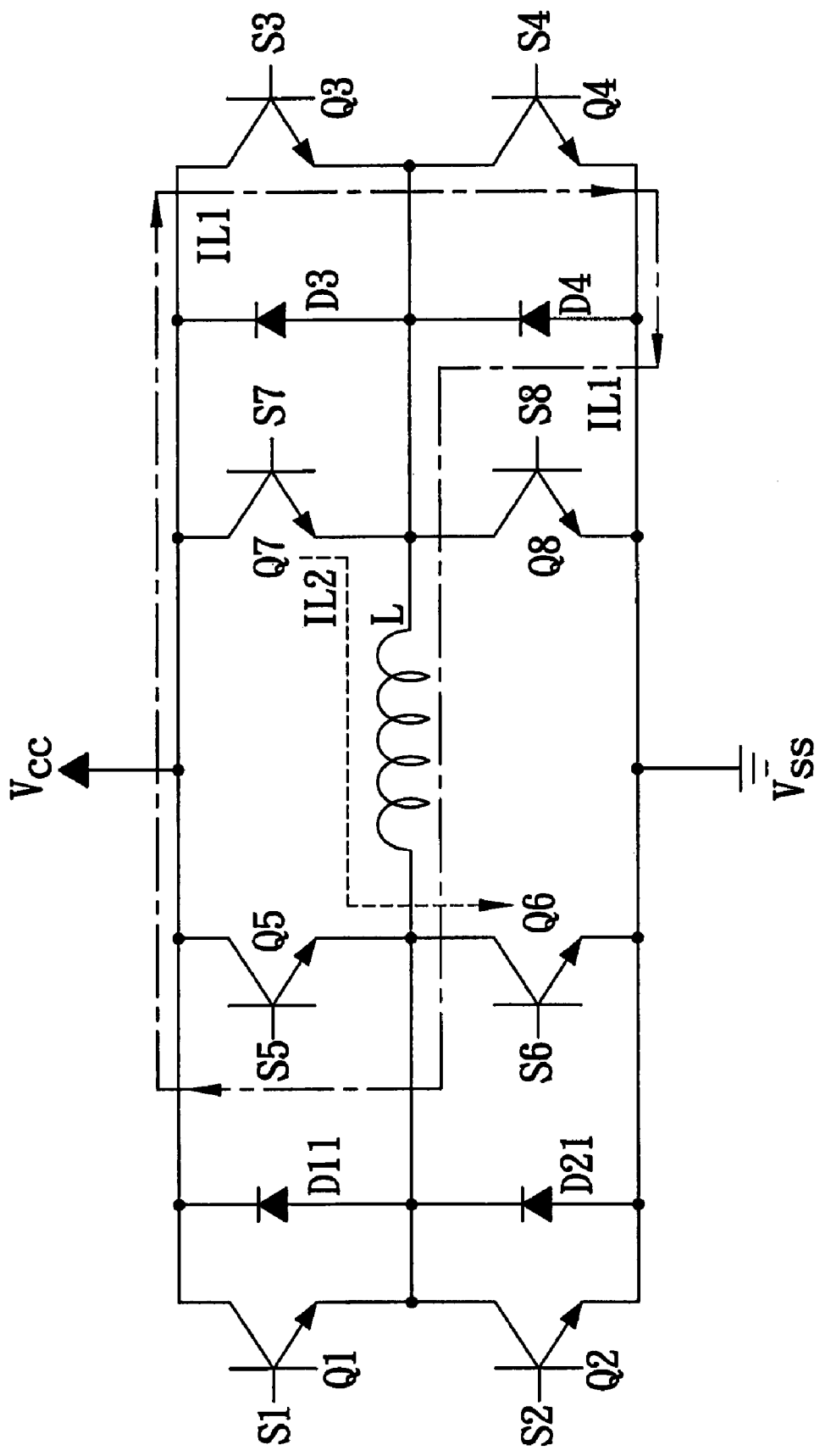
FIG. 8 is a schematic diagram of the recirculating path of the driving current of the present invention after the current phase has changed.

In order to illustrate the recirculating process of the driving current flowing through the single phase coil, please refer to FIGS. 5~9. FIG. 5 is a schematic diagram of the driving path of the driving current of the present invention. FIG. 6 is a schematic diagram of the recirculating path of the driving current of the present invention. FIG. 7 is a schematic diagram of the driving path of the driving current of the present invention after the current phase has changed. FIG. 8 is a schematic diagram of the recirculating path of the driving current of the present invention after the current phase has changed.

First, when the sine wave signal is not close to the zero cross point, the first driving signals S1, S4 and the second driving signals S5, S8 are on the high voltage status. At this time, the driving transistors Q1, Q4 and the auxiliary driving transistors Q5, Q8 conduct. The first driving signals S2, S3 and the second driving signals S6, S7 are on low voltage status. The driving transistors Q2, Q3 and the auxiliary driving transistors Q6, Q7 shut down.

When the driving transistors Q1, Q4 conduct, the first driving current IL1 charges the single phase coil L along the driving path composed of the conducted driving transistors Q1, Q4 and the single phase coil L and represented by a dot-dash line. At the same time, when the auxiliary driving transistors Q5, Q8 conduct, the second driving current IL2 charges the single phase coil L along the driving path composed of the conducted auxiliary driving transistors Q5, Q8 and the single phase coil L in a right direction while facing to the paper represented by a dash line, as shown in FIG. 5.

Next, when the sine wave signal is close to the zero cross point, the first driving signals S1, S4 change from 1 to 0 to shut down the driving transistors Q1, Q4. The second driving signals S5, S8 are still on high voltage status so that the auxiliary driving transistors Q5, Q8 still conduct. When the driving transistors Q1, Q4 shut down, the recirculating diodes D21, D22 conduct to make the first driving current IL1 consume and become zero at the recirculating path composed of the recirculating diodes D21, D22 and the single phase coil L in a right direction while facing to the paper. When the auxiliary driving transistors Q5, Q8 maintains the conducting status, the second driving current IL2 continually charges the single phase coil L in the right direction while facing to the paper, as shown in FIG. 6. Because the driving ability of the auxiliary driving transistors Q5, Q8 is far less than that of the driving transistors Q1, Q4, most of the driving current recirculates alone the dotted line path. As shown in FIG. 7, when the sine wave signal reaches the zero cross point, this means that the sine wave signal reaches the critical point of phase-switch. In other words, the hysteresis characteristic reaches the critical point of phase-switch. At this time, the first driving signals S1, S2, S3, S4 are still on low voltage status to make the driving transistors Q1, Q2, Q3, Q4 still shut down. The second driving signals S5, S8 change from 1 to 0 to shut down the auxiliary driving transistors Q5, Q8. The second driving signals S6, S7 change from 0 to 1 to conduct the auxiliary driving transistors Q6, Q7. When the auxiliary driving transistors Q6, Q7 conduct, the second driving current IL2 charges the single phase coil L along the driving path composed of the auxiliary driving transistors Q6, Q7 and the single phase coil L represented by a dotted line. Thereby, the condition of the rotating device of the single phase motor cannot be restarted because the sine wave signal located at the zero cross point is avoided.

When the sine wave signal passes through the zero cross point, it means that the phase of the sine wave signal is switched. At this time, the first driving signals S2, S3 change from 0 to 1 to conduct the driving transistors Q2, Q3, and the second driving signals S6, S7 also change from 0 to 1 to conduct the auxiliary driving transistors Q6, Q7. The first driving signals S1, S4 and the second driving signals S5, S8 are still on low voltage status to make the driving transistors Q1, Q4 and the auxiliary driving transistors Q5, Q8 still shut down.

When the driving transistors Q2, Q3 conduct, the first driving current IL1 charges the single phase coil L along the driving path composed of the conducted driving transistors Q2, Q3 and the single phase coil L represented by a dot-dash line. Because the auxiliary driving transistors Q6, Q7 also conduct, the second driving current IL2 also charges the single phase coil L.

When the sine wave signal is close to the zero cross point again, the first driving signals S2, S3 change from 1 to 0 to shut down the driving transistors Q2, Q3. The second driving signals S6, S7 are still on the high voltage status so that the auxiliary driving transistors Q6, Q7 still conduct. The first driving signals S1, S4 and the second driving signals S5, S8 are still on low voltage status to make the driving transistors Q1, Q4 and the auxiliary driving transistors Q5, Q9 still shut down. When the driving transistors Q2, Q3 shut down, the recirculating diodes D11, D12 conduct to make the first driving current IL1 consume and become zero at the recirculating path composed of the recirculating diodes D11, D12 and the single phase coil L represented by a dot-dash line in a left direction while facing to the paper. When the auxiliary driving transistors Q6, Q7 maintains the conducting status, the second driving current IL2 continually charges the single phase coil L in the left direction while facing to the paper.

When the sine wave signal reaches the zero cross point again, this means that the sine wave signal has reached the critical point of phase-switching. At this time, the first driving signals S1, S2, S3, S4 are still on low voltage status to make the driving transistors Q1, Q2, Q3, Q4 still shut down. The second driving signals S5, S8 change from 0 to 1 to conduct the auxiliary driving transistors Q5, Q8. The second driving signals S6, S7 change from 1 to 0 to shut down the auxiliary driving transistors Q6, Q7. When the auxiliary driving transistors Q6, Q7 shut down, the second driving current IL2 charges the single phase coil L along the driving path composed of the auxiliary driving transistors Q6, Q7 and the single phase coil L represented by a dotted line and shown in FIG. 5. After that, the above process is repeated.

The first driving current IL1 flowing through the single phase coil L in one direction slowly decreases and becomes zero, and switches to another direction when the sine wave signal is close to the zero cross point. Therefore, the vibration and the noise of the single phase motor are restrained. Furthermore, the second driving current IL2 is instantly turned on or shut down when the sine wave signal reaches the zero cross point. Therefore, the second driving current IL2 can continually charge the single phase coil L during the above pulse period to prevent the rotating device of the single phase motor from reaching a stopped status. Before the phase of the sine wave signal is switched, there is a driving signal with a longer timing to drive the driving transistors Q1, Q2, Q3, Q4 and prevent the current ripple from occurring on the single phase coil L.

In the embodiment, though the recirculating diodes are located outside of the driving transistors Q1, Q2, Q3, Q4 and the auxiliary driving transistors Q5, Q6, Q7, Q8, they are not limited to the above. The recirculating diode can be a parasitic diode located between two of driving transistors Q1, Q2, Q3, Q4, and two of the auxiliary driving transistors Q5, Q6, Q7, Q8. Thereby, the dimensions of the chip of the driving apparatus of the single phase motor are substantially reduced. Furthermore, though the reference value set in the absolute value circuit 230 is fixed, it is not limited. The reference value can be variable so that it can match the timing signal for a variety of single phase motors.

One merit of the present invention is that two sets of driving signals are used for simultaneously driving the single phase motor.

Another merit of the present invention is that two sets of driving signals are used for simultaneously driving the single phase motor, and these driving currents are in the sane direction.

A further merit of the present invention is that at least one driving signal drives the single phase motor when the phase of the sine wave signal is switched.

A further merit of the present invention is that a driving transistor with a smaller output driving current is added so that the single phase motor is still driven when the phase of the sine wave signal is switched.

A further merit of the present invention is that a set of recirculating diodes is adopted to cooperate with the single phase coil to form a recirculating path or a driving path.

A further merit of the present invention is that there is a driving signal with a longer timing to drive the driving transistors and prevent the current ripple from occurring on the single phase coil, before the phase of the sine wave signal is switched.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A driving apparatus for a single phase motor, comprising:
    a driving transistor unit coupled to a control unit and a single phase coil, wherein the driving transistor unit provides a first driving current with flowing direction to the single phase coil according to a set of first driving signals;
    an auxiliary driving transistor unit coupled to the control unit and the single phase coil, wherein the auxiliary driving transistor unit provides a second driving current whose flowing direction is the same as the first driving current to the single phase coil according to a set of second driving signals when the rotating device of the single phase motor rotates to a phase-switching point; and
    said control unit outputting the set of first driving signals and the set of second driving signals, wherein the set of first driving signals is started after a rotating device of the single phase motor rotates to the phase-switching point, and is shut down before the rotating device of the single phase motor rotates to the next phase-switching point, and the set of second driving signals is started or shut down when the rotating device of the single phase motor rotates to the phase-switching point.

2. The driving apparatus for a single phase motor as claimed in claim 1, further comprising a recirculating diode unit for cooperating with the single phase coil to form a recirculating path for recirculating the first driving current.

3. The driving apparatus for a single phase motor as claimed in claim 1, wherein the set of first driving signals and the set of second driving signals are simultaneously generated.

4. The driving apparatus for a single phase motor as claimed in claim 1, wherein a phase-switching delay timing of the set of first driving signals is larger than one of the set of second driving signals.

5. The driving apparatus for a single phase motor as claimed in claim 1, wherein the first driving current is larger than the second driving current.

6. The driving apparatus for a single phase motor as claimed in claim 1, wherein the control unit comprises a first pulse generator, a second pulse generator, and a signal tuner.

7. A driving method for a single phase motor, comprising:
    detecting a rotating location of a rotating device of the single phase motor to generate a sine wave signal;
    adjusting the sine wave signal to generate an amplified signal with a hysteresis characteristic;
    calculating a level of the sine wave signal and a reference value to generate an absolute value signal;
    calculating and processing the amplified signal and the absolute value signal to simultaneously generate a plurality of first driving signals and a plurality of second driving signals;
    outputting a first driving current from a driving transistor unit according to the first driving signals, wherein the first driving signals changes from 0 to 1 or from 1 to 0 when the sine wave signal is close to a zero cross point;
    outputting a second driving current from an auxiliary driving transistor unit according to the second driving signals, wherein the second driving signals changes from 0 to 1 or from 1 to 0 when the sine wave signal reaches a zero cross point;
    controlling the driving transistor unit and the auxiliary driving transistor unit to be conducted or shut down to recirculate the first driving current and the second driving current according to the sine wave signal; and
    driving the rotating device to rotate according to the first driving current and/or the second driving current.

8. The driving method for a single phase motor as claimed in claim 7, wherein a phase-switching delay timing of the set of first driving signals is larger than on of the set of second driving signals.

9. The driving method for a single phase motor as claimed in claim 7, wherein the first driving current is larger than the second driving current.

* * * * *